United States Patent [19]
Zehnder

[11] 3,949,620
[45] Apr. 13, 1976

[54] CABLE CYLINDER DEVICE

[75] Inventor: Paul Zehnder, Birmenstorf, Switzerland

[73] Assignee: The Raymond Lee Organization, Inc., New York, N.Y. ; a part interest

[22] Filed: Oct. 4, 1974

[21] Appl. No.: 512,029

[52] U.S. Cl............................ 74/225; 74/222
[51] Int. Cl.²........................................ F16H 7/04
[58] Field of Search............ 74/220, 222, 224, 225, 74/226

[56] References Cited
UNITED STATES PATENTS

| | | | |
|---|---|---|---|
| 497,706 | 5/1893 | Chase et al. | 74/222 X |
| 2,936,639 | 5/1960 | Philippi | 74/222 |

Primary Examiner—John J. Camby
Attorney, Agent, or Firm—Daniel Jay Tick

[57] ABSTRACT

A cable cylinder device comprises a substantially elongated housing having opposite end walls at the opposite ends of its length and a plurality of elongated side walls extending along its length between the end walls. A thrust roller in the housing has a support plate and first roller means rotatably mounted on the plate and second roller means rotatably mounted on the plate in spaced relation with the first roller means. A first guide roller in the housing is rotatably affixed to one of the end walls. A second guide roller means in the housing is rotatably affixed to the other of the end walls. A cylinder in the housing is affixed to one end wall of the housing and extends in the direction of the length of the housing. A piston rod is coaxially movably mounted in the cylinder and is affixed at one end to the support plate of the thrust roller. A cable in the housing is affixed at one end to an end wall, passes over the first roller means of the thrust roller, the first guide roller means, the second guide roller means, the second roller means of the thrust roller and is affixed at the other end to a side wall. A load bracket means affixed to the cable means in the area thereof between the first and second guide roller means whereby when the piston rod moves out of the cylinder in a predetermined direction, the thrust roller moves with it and the load bracket moves with the cable means in the opposite direction and when the piston rod moves into the cylinder in the opposite direction, the thrust roller moves with it and the load bracket moves with the cable means in the predetermined direction.

8 Claims, 20 Drawing Figures

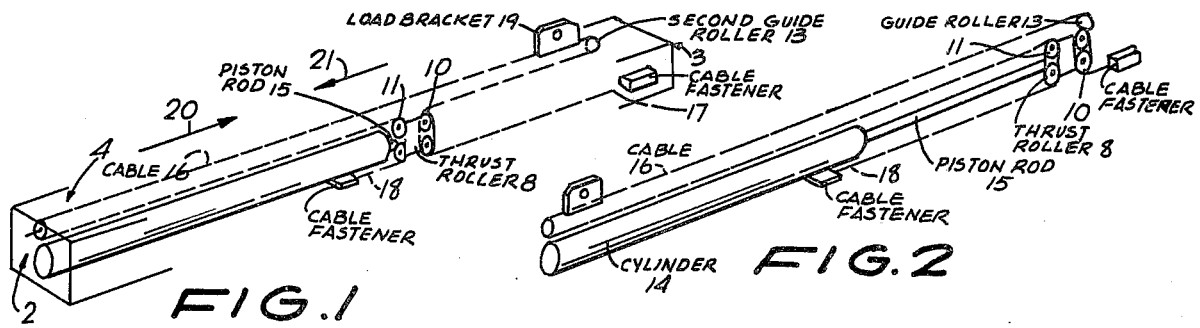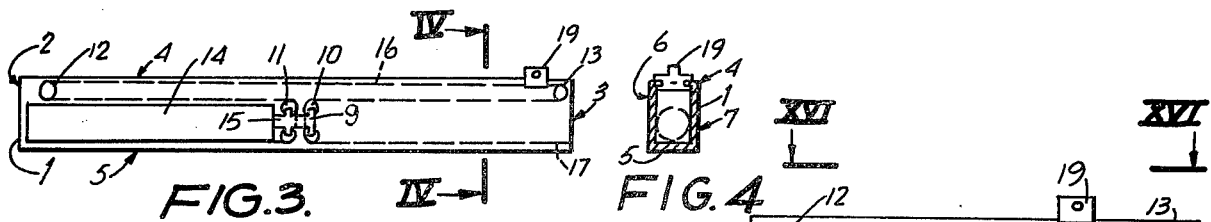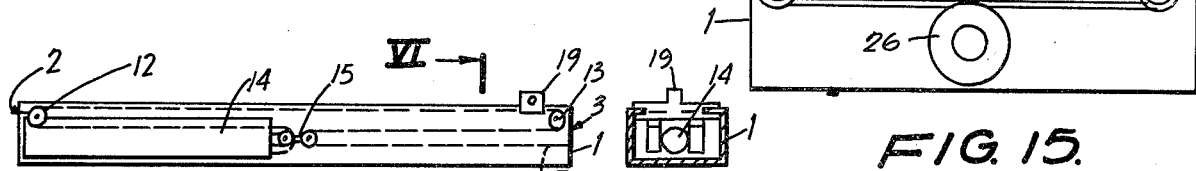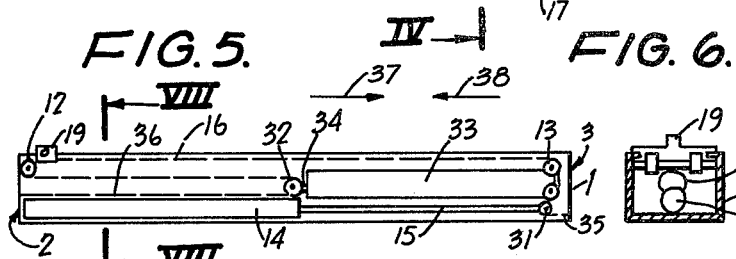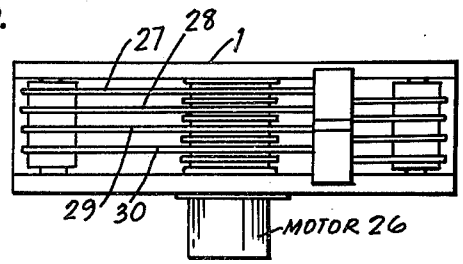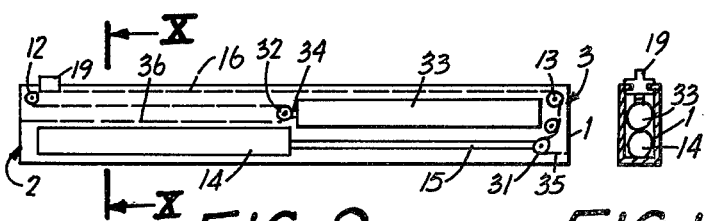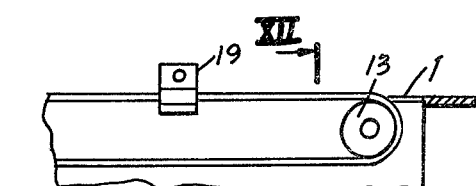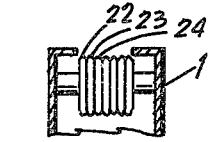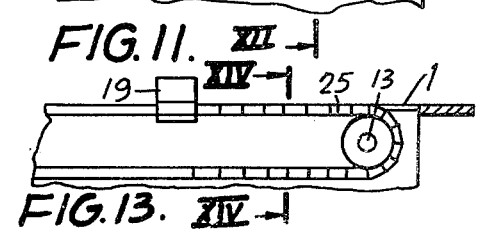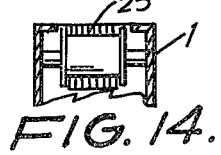

3,949,620

CABLE CYLINDER DEVICE

DESCRIPTION OF THE INVENTION

The present invention relates to a cable cylinder device.

Objects of the invention are to provide a cable cylinder device utilizing ordinary hydraulic or pneumatic cylinders, requiring no additional support, operating under the most severe conditions, requiring no maintenance, manufacturable for any operating length and any force, for hydraulic or pneumatic operation, simple in manufacture, requiring no special machinery for manufacture, inexpensive in manufacture due to the components being standardizable and overcoming the disadvantages of known cable cylinders such as, for example, having a system length which is much greater than the working length, having small hydraulic pressures and forces, being highly sensitive to dirt and having a cable which is relatively easily vulnerable whereby undue leakage of the cylinder results.

In order that the invention may be readily carried into effect, it will now be described with reference to the accompanying drawing, wherein:

FIG. 1 is a schematic diagram of an embodiment of the cable cylinder device of the invention in one condition of operation;

FIG. 2 is a schematic diagram of the embodiment of FIG. 1 in the other condition of operation;

FIG. 3 is a side view of the embodiment of FIGS. 1 and 2;

FIG. 4 is a sectional view, taken along the lines IV—IV, of FIG. 3;

FIG. 5 is a side view of a second embodiment of the cable cylinder device of the invention;

FIG. 6 is a sectional view, taken along the lines VI—VI, of FIG. 5;

FIG. 7 is a side view of a third embodiment of the cable cylinder device of the invention;

FIG. 8 is a sectional view, taken along the lines VIII—VIII, of FIG. 7;

FIG. 9 is a side view of a fourth embodiment of the cable cylinder device of the invention;

FIG. 10 is a sectional view, taken along the lines X—X, of FIG. 9;

FIG. 11 is a view of an embodiment of the cable of the cable cylinder device of the invention;

FIG. 12 is a view, taken along the lines XII—XII, of FIG. 11;

FIG. 13 is a view of another embodiment of the cable of the cable cylinder device of the invention;

FIG. 14 is a view, taken along the lines XIV—XIV, of FIG. 13;

FIG. 15 is a view of another embodiment of the device shown in FIG. 11;

FIG. 16 is a view, taken along the lines XVI—XVI, of FIG. 15;

In the FIGS., the same components are identified by the same reference numerals.

Figure 17:
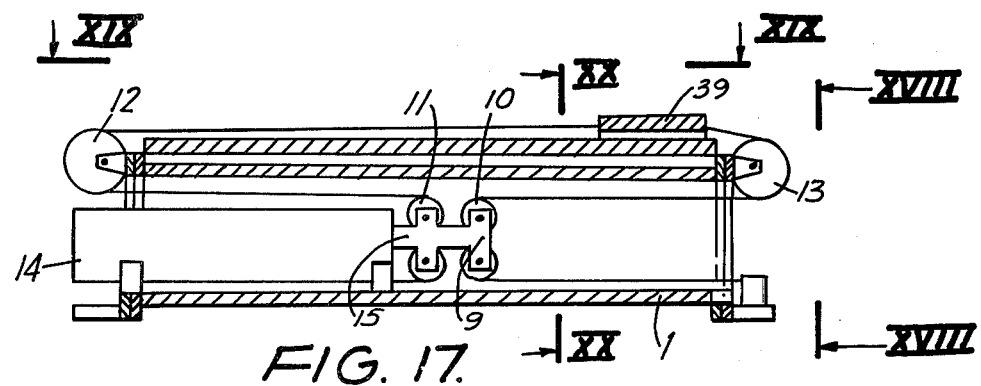
FIG. 17 is a side view, on an enlarged scale, of a fifth embodiment of the cable cylinder device of the invention.

The cable cylinder device of the invention, as shown in FIGS. 1 to 4, comprises a substantially elongated housing 1 having opposite end walls 2 and 3 at the opposite ends of its length and a plurality of elongated side walls 4, 5, 6 and 7 extending along its length between the end walls.

A thrust roller 8 is provided in the housing and has a support plate 9. First rollers 10 are rotatably mounted on the plate 9. Second rollers 11 are rotatably mounted on the plate 9 in spaced relation with the first rollers 10. A first guide roller 12 is provided in the housing 1 and is rotatably affixed to the end wall 2. A second guide roller 13 is provided in the housing 1 and is rotatably affixed to the end wall 3.

A cylinder 14 is provided in the housing 1 and is affixed to the end wall 2 of the housing. The cylinder 14 extends in the direction of length of the housing 1.

A piston rod 15 is coaxially movably mounted in the cylinder 14 and is affixed at one end to the support plate 9 of the thrust roller 8.

A cable device 16 is provided in the housing 1 and is affixed at one end 17 to the end wall 3. The cable device passes over the first rollers 10 of the thrust roller 8, the second guide roller 13, the first guide roller 12 and the second rollers 11 of the thrust roller, and is affixed at the other end 18 to the side wall 5.

A load bracket 19 is affixed to the cable device 16 in the area thereof between the first and second guide rollers 12 and 13. Thus, when the piston rod 15 moves out of the cylinder 14 in a predetermined direction, indicated by an arrow 20 in FIG. 1, the thrust roller 8 moves with it and the load bracket 19 moves with the cable device 16 in the opposite direction, indicated by an arrow 21 in FIG. 1. When the piston rod 15 moves into the cylinder 14 in the opposite direction, indicated by the arrow 21, the thrust roller 8 moves with it and the load bracket 19 moves with the cable device 16 in the predetermined direction, indicated by the arrow 20.

In the embodiment of FIGS. 1, 2, 3 and 4, the cable device 16 comprises a single cable.

In the embodiment of FIGS. 5 and 6, the cable device comprises a pair of cables in side-by-side relation.

In the embodiment of FIGS. 11 and 12, the cable device comprises separate wire ropes 22, 23, 24, and so on. This permits the utilization of guide rollers having smaller diameters and thus reduces the overall dimensions of the device to a considerable extent.

In the embodiment of FIGS. 13 and 14 the cable device comprises a chain 25 for heavy loads.

In the embodiment of FIGS. 15 and 16, a driving device such as, for example, a motor 26, is coupled to the cable device 16 and functions as a torque unit to provide small or large working lengths. Similarly to the embodiments of FIGS. 11 and 12, the cable device of FIG. 16 comprises a plurality of wire ropes or cables 27, 28, 29 and 30.

In the embodiments of FIGS. 7 and 8 and 9 and 10, a first thrust roller 31 in the first housing has a first roller. A second thrust roller 32 in the housing has a second roller. In addition to the first cylinder 14, a second cylinder 33 is provided in the housing and is affixed to the end wall 3 of said housing. The second cylinder 33 extends in the direction of length of the housing 1.

In the embodiments of FIGS. 7 and 8 and 9 and 10, the first piston rod 15 is affixed at one end to the first thrust roller 31. A second piston rod 34 is coaxially movably mounted in the second cylinder 33 and is affixed at one end to the second thrust roller 32. The cable device 16 of the embodiments of FIGS. 7 and 8 and 9 and 10 is affixed at one end 35 to the end wall 3 and passes over the first roller of the first thrust roller 31, the second guide roller 13, the first guide roller 12 and the second roller of the second thrust roller 32 and is affixed at its other end 36 to the end wall 2.

In the embodiment of FIGS. 7 and 8, the cable device comprises a pair of cables in side-by-side relation. In the embodiments of FIGS. 9 and 10, the cable device comprises a single cable.

Thus, in the embodiments of FIGS. 7 and 8 and 9 and 10, when the first piston rod 15 moves out of the first cylinder 14 in the predetermined direction, indicated by an arrow 37 in FIG. 7, the second piston rod 34 moves into the second cylinder 33 in the predetermined direction of the arrow 37, the first thrust roller 31 and the second thrust roller 32 move with them and the load bracket 19 moves with the cable device in the predetermined direction indicated by an arrow 38. When the first piston rod 15 moves into the first cylinder 14 in the opposite direction indicated by the arrow 38, the second piston rod 34 of the second cylinder 33 moves out of said second cylinder in the opposite direction, indicated by arrow 37, the first thrust roller 31 and the second thrust roller 32 move with them and the load bracket 19 moves with the cable device in the opposite direction of the arrow 38.

Since the first piston rod 15 and the second piston rod 34 are only stressed in tension, there is no risk of their being buckled.

Figure 18:
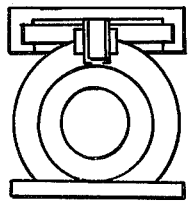
FIG. 18 is a view, taken along the lines XVIII—XVIII, of FIG. 17.
Figure 19:
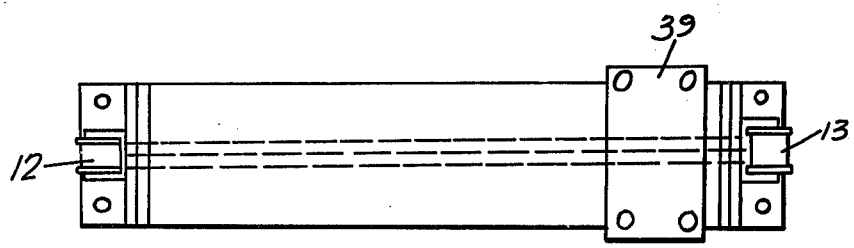
FIG. 19 is a view, taken along the lines XIX—XIX, of FIG. 17.
Figure 20:
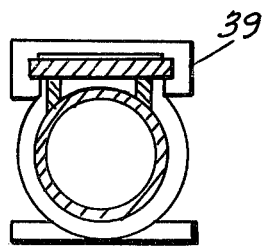
FIG. 20 is a view, taken along the lines XX—XX, of FIG. 17.

In the embodiment of FIGS. 17 to 20, a table 39 is provided for the unit. The load is thus taken up directly by the housing 1. Since additional support is not required, there are considerable savings.

While the invention has been described by means of specific examples and in specific embodiments, I do not wish to be limited thereto, for obvious modifications will occur to those skilled in the art without departing from the spirit and scope of the invention.

I claim:

1. A cable cylinder device, comprising
    a substantially elongated housing having opposite end walls at the opposite ends of its length and a plurality of elongated side walls extending along its length between the end walls;
    a thrust roller in the housing and having a support plate and first roller means rotatably mounted on the plate and second roller means rotatably mounted on the plate in spaced relation with the first roller means;
    first guide roller means in the housing rotatably affixed to one of the end walls;
    second guide roller means in the housing rotatably affixed to the other of the end walls;
    a cylinder in the housing affixed to one end wall of the housing and extending in the direction of length of the housing;
    a piston rod coaxially movably mounted in the cylinder and affixed at one end to the support plate of the thrust roller;
    cable means in the housing affixed at one end to an end wall, passing over the first roller means of the thrust roller, the first guide roller means, the second guide roller means, the second roller means of the thrust roller and affixed at the other end to a side wall; and
    load bracket means affixed to the cable means in the area thereof between the first and second guide roller means whereby when the piston rod moves out of the cylinder in a predetermined direction the thrust roller moves with it and the load bracket moves with the cable means in the opposite direction and when the piston rod moves into the cylinder in the opposite direction the thrust roller moves with it and the load bracket moves with the cable means in the predetermined direction.

2. A cable cylinder device as claimed in claim 1, wherein the cable means comprises a single cable.

3. A cable cylinder device as claimed in claim 1, wherein the cable means comprises a pair of cables in side-by-side relation.

4. A cable cylinder device as claimed in claim 1, wherein the cable means comprises a chain.

5. A cable cylinder device as claimed in claim 1, wherein the cable means comprises a plurality of separate wire ropes.

6. A cable cylinder device as claimed in claim 1, further comprising driving means coupled to the cable means.

7. A cable cylinder device, comprising
    a substantially elongated housing having opposite end walls at the opposite ends of its length and a plurality of elongated side walls extending along its length between the end walls;
    a first thrust roller in the housing and having first roller means;
    a second thrust roller in the housing and having second roller means;
    first guide roller means in the housing rotatably affixed to one of the end walls;
    second guide roller means in the housing rotatably affixed to the other of the end walls;
    a first cylinder in the housing affixed to one end wall of the housing and extending in the direction of length of the housing;
    a second cylinder in the housing affixed to the other end wall of the housing and extending in the direction of length of the housing;
    a first piston rod coaxially movably mounted in the first cylinder and affixed at one end to the first thrust roller;
    a second piston rod coaxially movably mounted in the second cylinder and affixed at one end to the second thrust roller;
    cable means in the housing affixed at one end to an end wall, passing over the first roller means of the first thrust roller, the first guide roller means, the second guide roller means, the second roller means of the second thrust roller and affixed at the other end to the other end wall; and
    load bracket means affixed to the cable means in the area thereof between the first and second guide roller means whereby when the first piston moves out of the first cylinder in a predetermined direction, the second piston rod moves into the second cylinder, the first and the second thrust rollers move with them and the load bracket moves with the cable means in the opposite direction to the first piston rod, and when the first piston rod moves into the first cylinder in the opposite direction, the second piston rod moves out of the second cylinder in the opposite direction, the first and the second thrust rollers move with them and the load bracket moves with the cable means in the predetermined direction.

8. A cable cylinder device as claimed in claim 7, wherein the cable means comprises a single cable.

* * * * *